US008054788B2

United States Patent
Ma et al.

(10) Patent No.: US 8,054,788 B2
(45) Date of Patent: Nov. 8, 2011

(54) METHOD OF CONFIGURING AND SEARCHING HIGH SPEED SHARED CONTROL CHANNEL OF MULTI-CARRIER CELL

(75) Inventors: Zijiang Ma, Shenzhen (CN); Zhifeng Ma, Shenzhen (CN); Yincheng Zhang, Shenzhen (CN); Yongqiang Zheng, Shenzhen (CN)

(73) Assignee: ZTE Corporation, Guangdong (CN)

( * ) Notice: Subject to any disclaimer, the term of this patent is extended or adjusted under 35 U.S.C. 154(b) by 802 days.

(21) Appl. No.: 12/063,871

(22) PCT Filed: Aug. 17, 2006

(86) PCT No.: PCT/CN2006/002089
§ 371 (c)(1),
(2), (4) Date: Jun. 4, 2008

(87) PCT Pub. No.: WO2007/019800
PCT Pub. Date: Feb. 22, 2007

(65) Prior Publication Data
US 2009/0116432 A1    May 7, 2009

(30) Foreign Application Priority Data

Aug. 17, 2005  (CN) ........................ 2005 1 0090607
Jan. 10, 2006  (CN) ........................ 2006 1 0000266

(51) Int. Cl.
*H04W 4/00* (2009.01)
(52) U.S. Cl. ........................................ 370/329; 455/434
(58) Field of Classification Search .................. 370/329, 370/328, 330, 336, 338, 345, 346, 347, 348; 455/434, 450, 451, 452.1
See application file for complete search history.

(56) References Cited

U.S. PATENT DOCUMENTS

| | | | |
|---|---|---|---|
| 5,710,973 A * | 1/1998 | Yamada et al. | 455/434 |
| 5,711,001 A * | 1/1998 | Bussan et al. | 455/432.1 |
| 5,953,665 A * | 9/1999 | Mattila | 455/434 |
| 6,044,074 A * | 3/2000 | Zehavi et al. | 370/350 |
| 6,108,541 A * | 8/2000 | Yazaki et al. | 455/434 |
| 6,246,875 B1 * | 6/2001 | Seazholtz et al. | 455/432.1 |
| 6,778,827 B1 * | 8/2004 | Anderson et al. | 455/434 |
| 6,810,251 B2 * | 10/2004 | Hassan et al. | 455/434 |
| 6,992,997 B1 * | 1/2006 | Refai et al. | 370/329 |
| 7,096,016 B2 * | 8/2006 | Hasegawa | 455/434 |

(Continued)

*Primary Examiner* — Christopher M Brandt
(74) *Attorney, Agent, or Firm* — IP Strategy Group, P.C.

(57) ABSTRACT

The present invention relates to a method for configuring and searching HS-SCCHs of a multi-carrier cell in a TD-SCDMA system. The network side configures the configuration information of a HS-SCCH set for a UE and notifies the UE through high layer signaling, wherein each HS-SCCH corresponds to a frequency point of high speed shared resources; the UE divides the HS-SCCH set into several subsets, and HS-SCCHs of the same subset correspond to the same frequency points; the UE selects the minimum value N from the number of carriers supported by itself, the number of the frequency points, and the number of the HS-SCCH subsets; the UE searches each HS-SCCH subset to be searched in turn, and if a consistent HS-SCCH is found, then the UE stops searching the other HS-SCCHs of the subset, the UE moves said subset out of the group of the HS-SCCH subsets to be searched, and adds the found HS-SCCH into a valid HS-SCCH set to be monitored; if the number of the HS-SCCHs of the valid HS-SCCH set equals to N, then stop searching. The present invention can increase the efficiency of searching the HS-SCCHs by the UE with satisfying normal communication requires.

10 Claims, 4 Drawing Sheets

U.S. PATENT DOCUMENTS

| | | | |
|---|---|---|---|
| 7,917,140 B2* | 3/2011 | Palenius | 455/434 |
| 2001/0021199 A1* | 9/2001 | Lee et al. | 370/503 |
| 2004/0242248 A1* | 12/2004 | Goldberg et al. | 455/502 |
| 2005/0113089 A1* | 5/2005 | Bamburak et al. | 455/435.2 |
| 2005/0174966 A1* | 8/2005 | Lansford et al. | 370/329 |
| 2006/0209753 A1* | 9/2006 | Patel | 370/329 |
| 2006/0274714 A1* | 12/2006 | Chowdhary et al. | 370/347 |

* cited by examiner

METHOD OF CONFIGURING AND SEARCHING HIGH SPEED SHARED CONTROL CHANNEL OF MULTI-CARRIER CELL

PRIORITY CLAIM

This application is related to and claims priority to a commonly assigned International PCT Application, Serial No. PCT/CN2006/002089, filed Aug. 17, 2006, which is incorporated by reference herein.

FIELD OF THE INVENTION

The present invention relates to a TD-SCDMA (Time Division—Synchronization Code Division Multiple Access) system, and particularly to a method for configuring and searching high speed shared control channels (HS-SCCHs) of a multi-carrier cell in the system.

BACKGROUND OF THE INVENTION

TD-SCDMA can support asymmetric services satisfactorily, which is very effective in meeting the demands of mobile communication users for data services, which grow increasingly, and the architecture of the TD-SCDMA system is shown in FIG. 1. HSDPA (High Speed Downlink Packet Access) technology is a technology which provides high speed downlink data services for multiple users, and can meet the demands of the packet services having burst characteristics in downlinks, such as streaming data services and interactive applications. Data service and voice service have different service characteristics. A voice communication system generally adopts a power control technology to offset the influence of channel fading on the system so as to obtain a relatively stable speed, while the data service can relatively tolerate time delay and the short-term changes of the speed. Hence, the HSDPA adopts a corresponding speed according to the situations of the channel instead of trying to improve the situations of the channel.

To this end, HSDPA introduces a new kind of transmission channel, i.e., high speed downlink shared channel (HS-DSCH). Users share downlink code resources and power resources to conduct time division multiplexing. Before emitting a HS-PDSCH, the Node B first emits a high speed downlink control channel (HS-SCCH) to notify a mobile terminal (UE) of some necessary parameters. The HS-SCCH is used to carry physical layer control signalings on the HS-PDSCH for decoding. Through reading the information carried by the HS-SCCH, the mobile terminal can find high speed shared resources configured for the mobile terminal according to physical layer information, such as code channel, time slot and modulation manner, designated by the HS-SCCH. The mobile terminal monitors the HS-SCCH and inspects whether there is any information sent to it or not, and if there is, the mobile terminal begins to receive the HS-PDSCH, and demodulates the received data according to the configuration information of the obtained HS-PDSCH.

According to the current 3GPP protocol, in a TD-SCDMA system, a cell is configured for a carrier and the method for configuring high speed shared resources is as follows: one HS-PDSCH and multiple HS-SCCHs, wherein each HS-SCCH has a corresponding high speed shared information channel for HS-DSCH (HS-SICH). When the network side configures high speed shared resources for a mobile terminal, it configures 1 to 4 HS-SCCHs, constituting a HS-SCCH subset, and HS-SICHs which correspond to each HS-SCCH one by one meanwhile.

The flow of configuring HSDPA resources is shown in FIG. 2, and it includes the following steps:

Step 1. the UE applies for a HSDPA service to a RNC (Uu interface, RRC protocol);

Step 2. after receiving the service request message from the UE, the RNC applies for HSDPA resources to the Node B (Iub interface, NBAP protocol);

Step 3. the Node B allocates HSDPA resources for the UE and returns a response message to the RNC showing that the HSDPA resources are allocated successfully (Iub interface, NBAP protocol);

the above response message at least includes the following such as "RADIO LINK RECONFIGURATION READY". "RADIO LINK SETUP RESPONSE", and "RADIO LINK RECONFIGURATION RESPONSE"; and Step 4. after receiving the resource allocation message from the Node B, the RNC returns a response message of applying for services to the UE, wherein the response message includes relevant configuration information of the HSDPA (Uu interface, RRC protocol).

The above response message at least includes "CELL UPDATE CONFIRM", "RADIO BEARER SETUP", "RADIO BEARER RECONFIGURATION", "RADIO BEARER RELEASE", "PHYSICAL CHANNEL RECONFIGURATION", "TRANSPORT CHANNEL RECONFIGURATION", and etc.

According to the 3GPP protocol, according to the configuration information of the HS-SCCH in the response message, the mobile terminal searches each HS-SCCH of the allocated HS-SCCH set in turn, and through reading the "mobile terminal identification" information on the HS-SCCH, after the mobile terminal finds a HS-SCCH which is actually allocated to it, the mobile terminal will not monitor the other allocated HS-SCCHs as only one HS-SCCH can be allocated in one TTI (Transmission Time Interval). The mobile terminal will monitor the HS-SCCH all the time and find the dynamic parameter configuration of the HS-PDSCH through the signaling information it carries. However, at a certain TTI, when the mobile terminal cannot read from the HS-SCCH the mobile terminal identification being consistent with itself, or cannot read the HS-SCCH, the mobile terminal will monitor the allocated HS-SCCH set again until it finds one HS-SCCH which is consistent with its own mobile terminal identification.

In a TD-SCDMA multi-carrier system, when the network and the mobile terminal both support the configuration of high speed shared resources at multiple carriers for the mobile terminal, the network side needs to configure HS-PDSCHs on one or more carriers for the mobile terminal according to factors such as the capability of the mobile terminal, the service of the mobile terminal and the resources of the network, side. Meanwhile, the downlink control channels HS-SCCH of these HS-PDSCHs are configured on one carrier, and the carrier is the carrier which carries the DPCH (Dedicated Physical Channel) channel of the high layer signaling of the mobile terminal. One to four HS-SCCHs are allocated for the HS-SCCHs on each carrier, and all HS-SCCHs being consistent with the mobile terminal identification constitute the HS-SCCH set allocated for the mobile terminal. However, at each TTI, only one HS-SCCH can be allocated to each carrier.

According to the current multi-carrier HSDPA solution, the network side notifies, by a high layer signaling, the UE which HS-SCCH signaling resources are configured. However, the solution does not disclose that after re-configuring the HS-PDSCH, how to modify the HS-SCCH-related configuration information in the response message showing that the resources have been successfully allocated in step 3 and in the response message of applying for a service in step 4, and also does not disclose how the UE search and monitor these HS-SCCHs.

Specifically, in the multi-carrier HSDPA, the following existing problems need to be solved:

1) as all HS-SCCHs in all HS-SCCH sets are carried at one carrier, while the HS-PDSCHs are configured on different carriers, therefore when reads the HS-SCCH information, the mobile terminal can not know which carrier the HS-PDSCH corresponding to the HS-SCCH is carried on; and 2) The mobile terminal may find a HS-SCCH being consistent with its own identification in each HS-SCCH subset, which shows that the network side has configured high speed shared resources to the carrier indicated by the HS-SCCH. On the other hand, the mobile terminal may be not able to find a HS-SCCH being consistent with its own identification in some HS-SCCH sets, which shows that the network side has not configured high speed shared resources to the carrier, to which the HS-SCCH set corresponds, for the mobile terminal.

Then is it necessary for the UE to search the HS-SCCH set allocated to the UE itself for all HS-SCCHs in a traversal manner? If the UE does not need to search the HS-SCCH set allocated to itself for all HS-SCCHs, then at a certain TTI, how can the UE judge whether the search stops or not? And also, at each TTI, does the UE only need to monitor these HS-SCCHs being consistent with the UE identification, or does it need to search the HS-SCCH set for the other HS-SCCHs all the time?

SUMMARY OF THE INVENTION

The technical problem to be solved by the present invention is to provide a method for configuring and searching HS-SCCHs of a multi-carrier cell in a TD-SCDMA system, which can increase the UE's searching efficiency of the HS-SCCHs while satisfying normal communication requests.

In order to solve the above technical problem, the present invention provides a method for configuring and searching high speed shared control channel HS-SCCHs in a multi-carrier cell, which is applied to a time division synchronization code division multiple access system, and the method comprises the following steps:

(a) the network side configures the configuration information of a high speed shared control channel HS-SCCH set for a mobile terminal UE and notifies the UE through a high layer signaling, wherein the configuration information includes the information about the frequency points of high speed shared resources to which each HS-SCCH corresponds and the information about the number of the frequency points of the high speed shared resources;

(b) after receiving the high layer signaling, the UE saves the HS-SCCH set and divides it into several HS-SCCH subsets, wherein HS-SCCHs in the same subset correspond to the information about the same frequency point;

(c) when searching the HS-SCCHs, the UE first selects the minimum value represented as N from the number of carriers supported by itself, the number of frequency points configured by the network side and the number of the HS-SCCH subsets, and adds all HS-SCCH subsets into a group of the HS-SCCH subsets to be searched;

(d) the UE searches each HS-SCCH subset to be searched in turn, and if the UE find a HS-SCCH being consistent with its own identification in a subset, then stops searching the other HS-SCCHs from the subset, the UE moves the subset out of the group of the HS-SCCH subsets to be searched, and adds the searched HS-SCCH into a valid HS-SCCH set, and monitors all HS-SCCHs in the valid HS-SCCH set; and (e) the UE judges whether the number of the HS-SCCHs of the valid HS-SCCH set equals to N or not, if not, return to step (d), and if yes, stop searching and end.

Further, if one or more HS-SCCHs of the valid HS-SCCH set monitored by the UE cannot read out the identification being consistent with itself or cannot be read, the UE moves the HS-SCCH out of the valid HS-SCCH set and will not monitor it any more, then the UE searches the other HS-SCCHs of the same subset, if it finds a HS-SCCH being consistent with its on identification, the UE adds the same to the valid HS-SCCH set, otherwise, it adds the subset into the group of the HS-SCCH subsets to be searched, and then search is conducted according to the same method in steps (d) and (e).

In order to solve the above technical problems, the present invention further provides a method for configuring and searching a high speed shared control channel HS-SCCH in a multi-carrier cell, which is applied to a time division synchronization code division multiple access system, and the method comprises the following steps:

(a) the network side configures the configuration information of a high speed shared control channel HS-SCCH for a mobile terminal UE and notifies the UE through a high layer signaling, and the configuration information includes the information about the frequency points of high speed shared resources to which each HS-SCCH corresponds;

(b) after receiving the high layer signaling, the UE saves the HS-SCCH set and divides it into several HS-SCCH subsets, and HS-SCCHs in the same subset correspond to the information about the same frequency point;

(c) when searching the HS-SCCHs, the UE first selects the minimum value represented as N from the number of carriers supported by itself and the number of the HS-SCCH subsets, and adds all HS-SCCH subsets into the group of the HS-SCCH subsets to be searched;

(d) the UE searches each HS-SCCH subset to be searched in turn, and if the UE finds a HS-SCCH being consistent with its own identification in a subset, then stops searching the other HS-SCCHs in the subset, the UE moves the subset out of the group of the HS-SCCH subsets to be searched, and adds the searched HS-SCCH into a valid HS-SCCH set, and monitors all HS-SCCHs in the valid HS-SCCH set;

(e) the UE judges whether the number of the HS-SCCHs of the valid HS-SCCH set equals to N or not, if not, return to step (d), and if yes, stop searching and end.

For each HS-SCCH, the method according to the present invention adds the information about the frequency points of the high speed shared resources to which it corresponds, thus can judge which carrier the HS-PDSCH corresponding to the HS-SCCH is carried on. In addition, the UE adopts a two-layer search manner during searching, so the search efficiency is improved. And also, when the network side dynamically adjusts the high speed shared resources, all configured HS-SCCHs can be searched and normal communication can be ensured. In addition, the present invention has advantages such as easy realization and good compatibility.

EMBODIMENTS OF THE INVENTION

The present invention is further described in detail in conjunction with the accompanying drawings and embodiments thereof.

Figure 1:
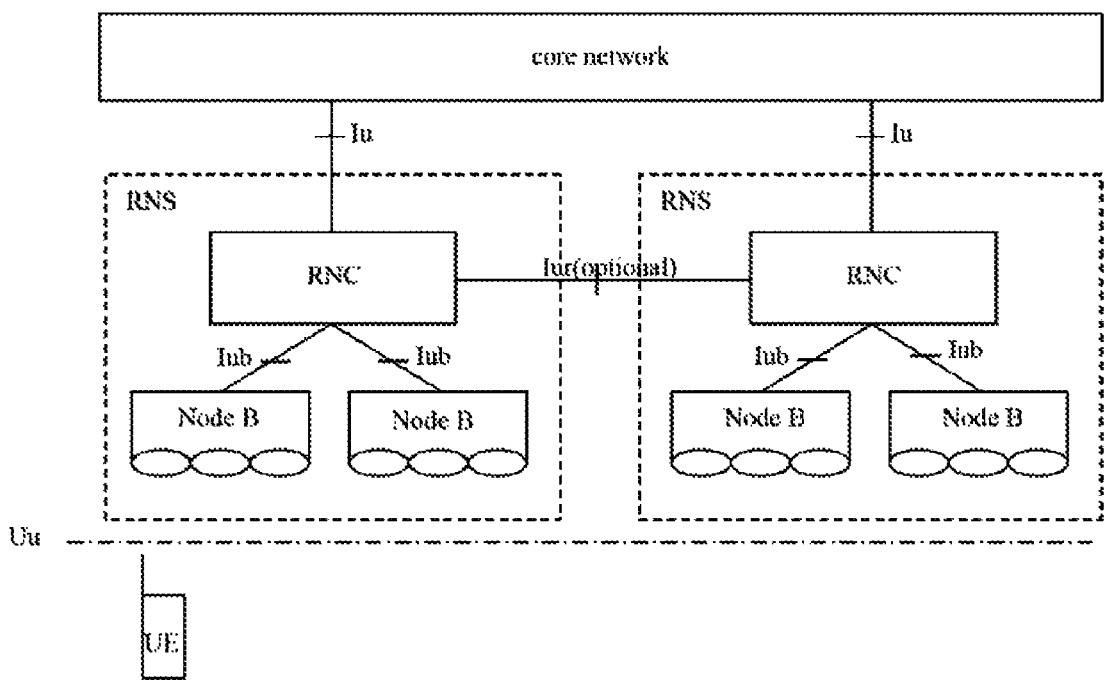
FIG. 1 is a schematic view of the architecture of the TD-SCDMA system.
Figure 2:
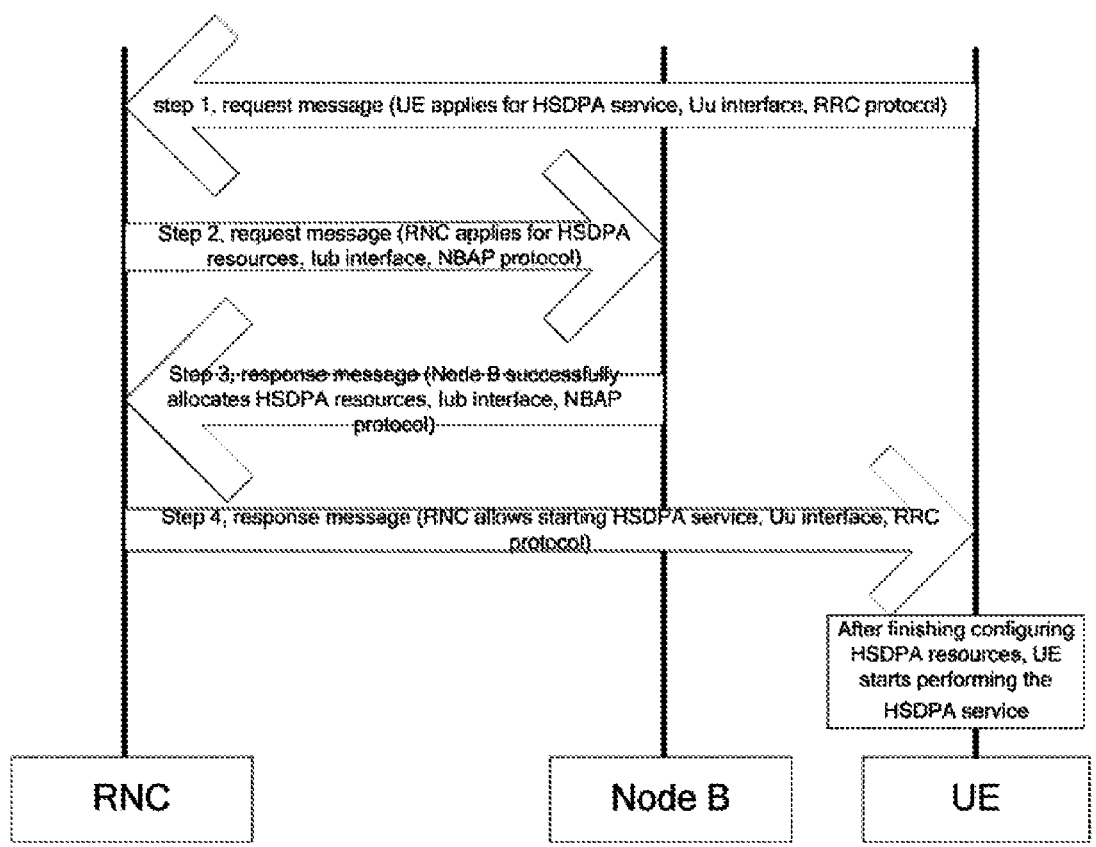
FIG. 2 is a flow chart illustrating the configuration of current HSDPA resources.
Figure 3:
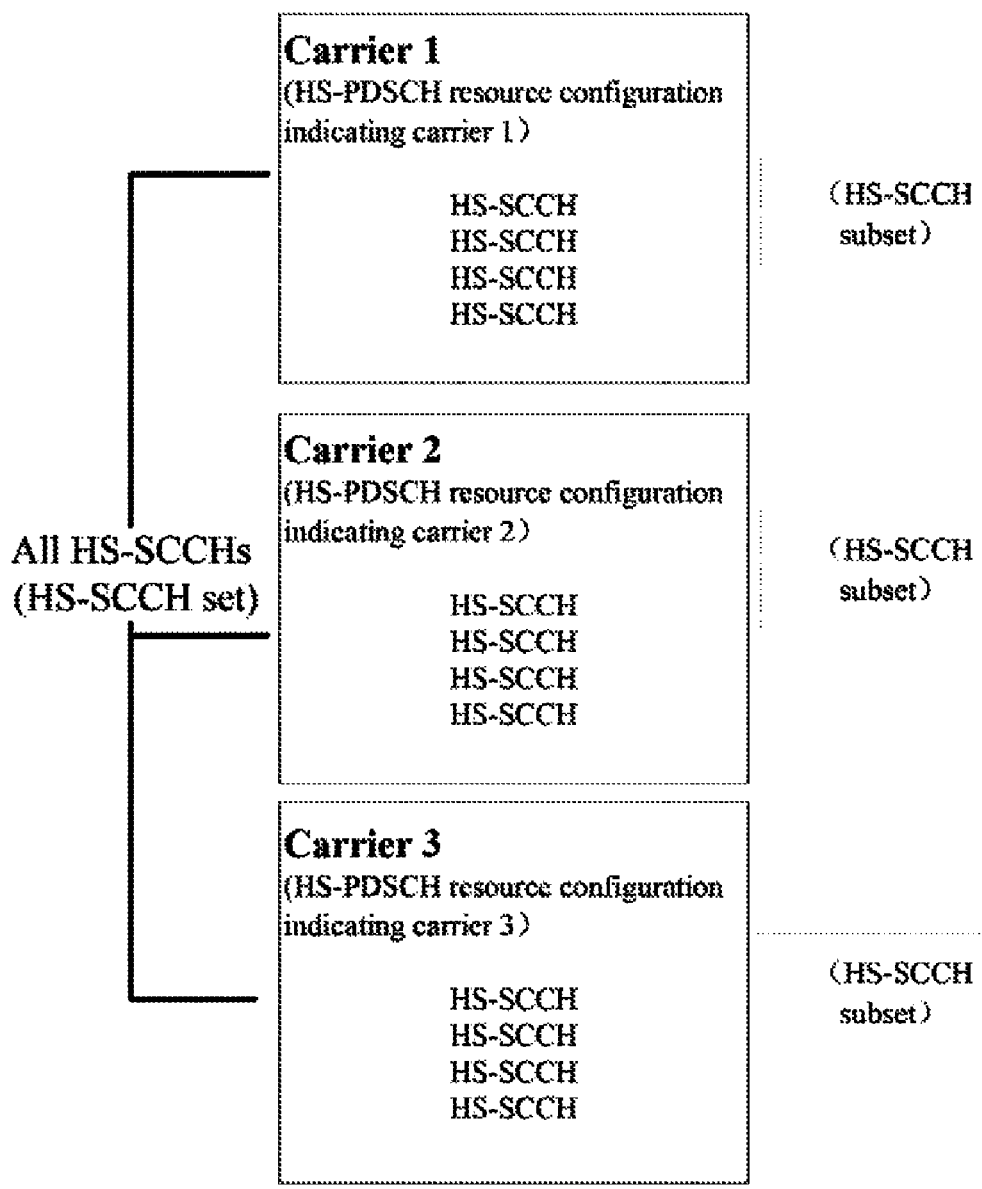
FIG. 3 is a schematic view in which all HS-SCCHs are stored in a UE according to an embodiment of the present invention.

The present invention does not need to change the service flow shown in FIG. 1, while has to reconfigure the information elements representing the HS-SCCHs, and in the NBAP (Node B Application Part) protocol applied to the Iub interface, a response message showing that the HSDPA resources have been successfully allocated, returned by the Node B to the RNC, is modified, and one to four HS-SCCHs (designated by the parameter "maxNoOfHSSCCHcode" in the following table) are configured for each carrier (or referred to as frequency point) of the high speed shared resources in the message. However, at the same TTI, only one HS-SCCH with the identification of the UE can be included in each HS-SCCH subset. The HS-SCCHs corresponding to the same carrier constitute a HS-SCCH subset, and all HS-SCCHs allocated for the UE constitute a HS-SCCH set.

In addition, a new IE, i.e. "HS-SCCHs Number", needs to be added into the "HS-PDSCH Information Response" IE information element of these messages, and the new IE is used to show the number of the HS-SCCHs including terminal identification information and represents the number of the frequency points of the high speed shared resources actually configured by the network side, wherein the number is smaller than or equal to the number of the configured HS-SCCH subsets. In the configuration information (herein, in the "HS-SCCH Specific Information Response LCR" information element) of each HS-SCCH in the "HS-PDSCH Information Response" information unit, a new IE, i.e. "HS-PDSCH UARFCN", is added to show the information about the frequency points of the high speed shared resources corresponding to the HS-SCCHs.

The two newly added information items are set to be optional. The information about the frequency points of the high speed shared resources is optional, which is not configured in a single-carrier but must be configured in a multi-carrier. The information of the number of the frequency points of the high speed shared resources, i.e. the number of the HS-SCCHs including the terminal identification information, is only applied to a multi-carrier, and may also not be configured in a multi-carrier. In this case, it can be compatible with single-carrier cells.

The following table can be referred to for relevant contents of the modified HS-PDSCH Information Response information element (only part of the contents is shown):

| HS-PDSCH Information Response | | | |
|---|---|---|---|
| IE(information element) | Presence | Range | Semantics Description |
| ... | ... | ... | ... |
| HS-SCCH Specific Information Response LCR | | 0 ... <maxNoOfHSSCCHcodes> | |
| ... | ... | ... | ... |
| >HS-PDSCH UARFCN | O | | Note: this new IE is for multi-frequency only |
| HS-SCCHs Number | O | Integer (0, 1, . . . 6) | Note: this new IE is for multi-frequency only |
| ... | ... | ... | ... |

Meanwhile, in the RRC (Radio Resource Control) protocol at the Uu interface (air interface), the response message of applying for a service returned by the RNC to UE is modified, wherein the configuration of the HS-SCCH is the same with the above response message returned to show that the HSDPA resources have been successfully allocated, so it is omitted here.

In addition, a new IE, i.e., "HS-SCCHs Number", needs to be added into a "HS-SCCH Info" information element of these messages, indicating the number of the HS-SCCHs including the terminal identification information, which represents the number, smaller than or equal to the number of the configured HS-SCCH subsets, of the frequency points of the high speed shared resources actually configured by the network side. In the configuration information (herein, in a "HS-SCCH Set Configuration" information element) of each HS-SCCH in the "HS-SCCH Info" information element, a new IE, i.e., "HS-PDSCH UARFCN", is added to indicate the information about the frequency points of the high speed shared resources to which the HS-SCCHs correspond. The newly added information items can be optional items. The information about the frequency points of the high speed shared resources is not configured on a single-carrier but must be configured on a multi-carrier. The information of the number of the frequency points of the high speed shared resources may not be configured in a multi-carrier.

The relevant contents of the modified HS-SCCH Info information element can refer to the following table (only part of the contents is shown):

| HS-SCCH Info | | | |
|---|---|---|---|
| Information Element | Need (necessity) | Multi | Semantics description |
| ... | ... | ... | ... |
| >>>>HS-SCCH Set Configuration | MP | 1 to <maxHS-SCCHs> | ... |
| ... | ... | ... | ... |
| >>>>>HS-PDSCH UARFCN | OP (optional) | | Note: this new IE is for multi-frequency only |
| >>>>HS-SCCHs Number | OP | Integer (0, 1, . . . 6) | Note: this new IE is for multi-frequency only |

After modifying the protocol, the high layer signaling (in the present embodiment, it refers to the response message of applying for a service returned by the RNC to the UE) sent to the UE from the network side includes the configuration information of each HS-SCCH in the HS-SCCH set and the information about the corresponding frequency point, and meanwhile, it may also include the information of the number of the frequency points of the high speed shared resources.

After finishing the preliminary configuration of the number of carriers, the frequency points and the like, the network side may also dynamically adjust the high speed shared resources, such as adding carriers and reducing carriers or shifting carriers and frequency points. However, in the procedure of requesting a HSDPA service, the network side sends the configuration information to the UE one time only through the high layer signaling. But the number of the frequency points of the high speed shared resources preliminarily configured by the network side is an upper limit, and the number of the subsequent frequency points subjected to dynamic adjustment cannot exceed this value.

Figure 4:
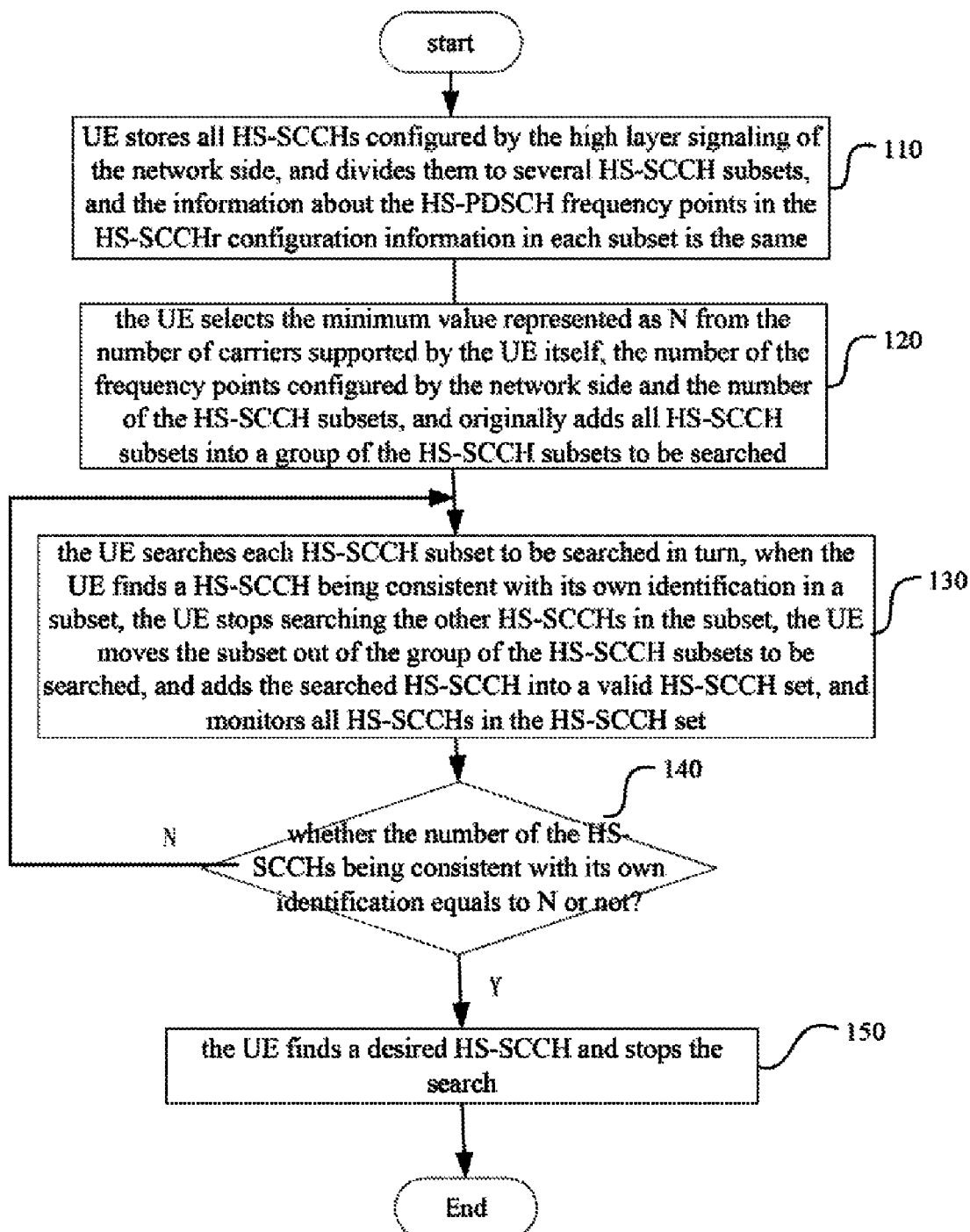
FIG. 4 is a flow chart illustrating that the UE searches the HS-SCCHs being consistent with its own identification according to the embodiment of the present invention.

Correspondingly, the method for the UE to search multiple HS-SCCHs being consistent with its own identification is shown in FIG. 4, and it includes the following steps:

Step 110. the UE stores all HS-SCCHs configured by the network side through the high layer signaling, hereinafter referred to as a HS-SCCH set, and divides it to several HS-SCCH subsets, and the information about the frequency points of the high speed shared resources in the configuration information of each HS-SCCH in the same subset is the same;

Step 120. when the UE is going to search the HS-SCCH, it first selects the minimum value represented as N from the number of carriers supported by the UE itself, the number of the frequency points of the high speed shared resources configured by the network side and the number of the HS-SCCH subsets, and adds all HS-SCCH subsets into a group of the HS-SCCH subsets to be searched;

under normal circumstances, the number of the frequency points of which the high layer signaling of the network side notifies the UE will not exceed the number of the HS-SCCH subsets and the number of the carriers supported by the UE;

Step 130. the UE searches each HS-SCCH subset to be searched in turn, and if a HS-SCCH being consistent with its own identification is obtained from a subset then the UE stops searching the other HS-SCCHs in the subset, the UE moves the subset out of the group of the HS-SCCH subsets to be searched, and adds the searched HS-SCCH to a valid HS-SCCH set, and monitors all HS-SCCHs in the valid HS-SCCH set;

Step 140. the UE judges whether the number of the HS-SCCHs being consistent with its own identification equals N, if yes, execute step 150, and if not, return to step 130 to continue the search; and Step 150. the UE has searched the desired HS-SCCHs, and the search is stopped and end.

In the above flow, the UE adopts a two-layer manner for the search of the HS-SCCH, i.e., searching the HS-SCCH subset and searching the HS-SCCHs in each HS-SCCH subset. Searching the HS-SCCH subset can determine which carriers, i.e., the HS-PDSCH frequency points indicated by the HS-SCCH subset, the high speed shared resources are configured for, and searching each HS-SCCH in the HS-SCCH subset can determine which HS-SCCH in each HS-SCCH subset includes the identification of the terminal itself. Meanwhile, since searching the other HS-SCCHs in the subset is stopped upon the UE obtaining the HS-SCCH being consistent with its own identification from the subset, the search efficiency can be improved.

In the above flow, when search is stopped in step 150, the HS-SCCH subset to be searched may have surplus HS-SCCH subsets. Hence, the search efficiency can be improved according to the above flow and resources can be saved.

In the above flow, when the network side only allocates the high speed shared resources at one carrier, the HS-SCCH set only has one HS-SCCH subset, and the search performed by UE is in a manner of only searching one HS-SCCH subset, which is the same with the manner of searching the HS-SCCH performed by UE in the current 3GPP protocols. Hence, the search method of UE according to the present invention is compatible to the current protocols.

As described above, after the network side finishes the preliminary configuration of the number of the carriers, the frequency points and the like, the network side may further dynamically adjust the high speed shared resources under actual situations, including: A. increasing carriers; B. decreasing carriers; and C. shifting carriers and frequency points. In addition, there is another way D, that is, the network side adjusts the HS-SCCHs, which include the identification of the terminal, into the other HS-SCCHs of the same HS-SCCH subset.

Under the above three ways B, C, and D, one or more HS-SCCHs in the valid HS-SCCH set monitored by the UE cannot read out an identification being consistent with itself or cannot be read, then the UE moves the HS-SCCH out of the valid HS-SCCH set and will not monitor it any more, then the UE searches the other HS-SCCHs in the same subset, if it finds a HS-SCCH being consistent with its own identification, the UE adds the same into the valid HS-SCCH set. If the UE finds no HS-SCCH being consistent with its own identification, it adds the subset into a group of the HS-SCCH subsets to be searched, and then conducts searching in the same way with the above steps 130 and 150, while if shifting of carriers and frequency points occurs, a HS-SCCH being consistent with the identification of the UE can be found in another HS-SCCH subset.

For the above way A, when the number of the HS-PDSCH frequency points and the number of the HS-SCCH subsets configured by the original network side are smaller than that of the carriers supported by the UE, and the number of the frequency points and the number of the HS-SCCH subsets configured in the high layer signaling are more than or equal to that of the carriers supported by the UE, if the UE still cannot find N HS-SCCHs being consistent % kith its own identification until search all HS-SCCH subsets, the UE will conduct search repeatedly, and can find newly added HS-SCCHs being consistent with its own identification, thus avoiding affecting communication due to the failure in searching valid HS-SCCHs.

The following is an embodiment in order to further describe the searching process performed by the UE. Suppose that the UE has the capability of HSDPA of 3-carrier.

The Primary Configuration:

When the UE applies for a HSDPA service, the HS-SCCH set allocated to the UE by the network side through the high layer signaling includes four HS-SCCH subsets corresponding to the configuration information of the high speed shared resources of four carriers.

The number of the frequency points of the high speed shared resources actually configured by the network side for the UE is smaller than that of the multi-carrier HSDPAs supported by the UE. Suppose that the network side allocates high speed shared resources at two carriers for itself, it obvious that HS-SCCHs being consistent with the identification of the UE can only be found in two HS-SCCH subsets;

the UE searches four HS-SCCH subsets in turn;

the UE finds a HS-SCCH being consistent with its own identification in two HS-SCCH subsets, adds the same into the valid HS-SCCH set, and moves the two HS-SCCH subsets out of the group of the HS-SCCH subsets to be searched;

the UE only monitors two HS-SCCHs in the valid HS-SCCH set, and meanwhile, search continues in two HS-SCCH subsets of the HS-SCCH subsets to be searched, because the UE has the ability of supporting the HSDPA of three-carriers;

The Second Time Configuration:

the number of the carriers of the high speed shared resources configured by the network side for the UE increases to the high speed shared resources of the three carriers supported by the UE, and correspondingly, one HS-SCCH being consistent with the identification of the UE itself is configured in one of another two HS-SCCH subsets, that is, adding carriers;

the UE goes on monitoring the two HS-SCCHs being consistent with its own identification in the first two HS-SCCH subsets, and, it finds one HS-SCCH being consistent with its own identification in the third HS-SCCH subset and adds it into the valid HS-SCCH set, and moves the third HS-SCCH subset out of the group of the subsets to be searched;

as the number of the HS-SCCHs being consistent with the identification of the UE is equal to that of the multi-carriers supported by the UE, then the UE only monitors the three HS-SCCHs in the valid HS-SCCH set and will not search a fourth HS-SCCH subsets;

The Third Time Configuration:

the network side dynamically adjusts the frequency points among the high speed shared resources of multiple carriers, changes one of the first three HS-SCCH subsets and will not configure the HS-SCCHs being consistent with the identification of the UE itself, while configures HS-SCCHs being consistent with the identification of the UE itself in the fourth HS-SCCH subset, that is, shifting of carriers and frequency points occurs;

the UE goes on monitoring the two HS-SCCHs in the valid HS-SCCH sets, while the other HS-SCCH will not find a UE identification being consistent with itself or cannot read the HS-SCCH, and the UE moves it out of the valid HS-SCCH set;

the UE first searches the other HS-SCCHs in the subset to which the HS-SCCH belongs, and cannot find a consistent HS-SCCH, and then adds the subset into the group of the HS-SCCH subsets to be searched;

the UE begins to search the fourth HS-SCCH subset, and if finds a HS-SCCH being consistent with its own identification, then adds it into the valid HS-SCCH set to be monitored;

later, as the number of the HS-SCCHs being consistent with the identification of the UE is equal to that of the multi-carriers supported by the UE, then the UE will not search the third HS-SCCH subset and only monitor the three HS-SCCHs in the valid HS-SCCH set; and The fourth time configuration:

the network side does not configure the HS-SCCH being consistent with the identification of the UE itself for one of the three HS-SCCH subsets, that is, decreasing carriers.

the UE will not find a UE identification being consistent with itself from one HS-SCCH in the valid HS-SCCH set or cannot find a HS-SCCH, and then the UE moves it out of the valid HS-SCCH set;

the UE first searches the other HS-SCCHs in the subset to which the HS-SCCH belongs, and cannot find a consistent HS-SCCH, and then adds the subset into the group of the HS-SCCH subsets to be searched; and the UE monitors the two HS-SCCHs in the valid HS-SCCH set and repeatedly searches two HS-SCCHs in the group of the HS-SCCH subsets to be searched.

In another embodiment according to the present invention, the number of the frequency points of the high speed shared resources configured for the UE is not included in the high layer signaling of the network side or the number of the frequency points is configured as an invalid value such as zero in the high layer signaling of the network side. The method for searching the HS-SCCHs by UE includes searching after the dynamic adjustment, and its difference from the above embodiment only lies in the value of N, that is, the UE needs to select the minimum value as N from the number N3 of the carriers supported by the UE itself and the number of the HS-SCCH subsets. The other steps are the same with those in the above embodiment.

Owing to the above mentioned, the following prominent technical effects can be achieved using the method according to the present invention:

1) when the network side of the TD-SCDMA system performs reconfiguration of the frequency points of a high speed downlink shared channel, for each HS-SCCH, the information about the frequency point indicating that the HS-SCCH corresponds to high speed shared resources is added, in this case, the mobile terminal can judge the carrier to which the HS-PDSCH belongs according to the carrier information;

2) when the UE performs searching, the HS-SCCHs corresponding to the same frequency points of the high speed shared resources are taken as a HS-SCCH subset, the UE will not search the other HS-SCCHs in the subset once it finds one HS-SCCH including its identification in each HS-SCCH subset. No matter when the network side configures the carriers or the network side dynamically adjusts the carriers, such as adding and decreasing carriers and shifting frequency points, the searching processes are similar, and in this case, the searching efficiency is obviously improved;

3) in the case of dynamically adjusting the high speed shared resources by the network side, for example, when HS-SCCHs being consistent with the identification of the UE are added into the original HS-SCCH set, as long as the number does not exceed the number of the carriers supported by the UE, the UE can still find all consistent HS-SCCHs and normal communication is ensured;

4) according to the number of the frequency points of the high speed shared resources allocated by the network side for the UE and the number of the HS-SCCH subsets, the UE stops searching when the total number of the found HS-SCCHs reaches the minimum value among the number of the frequency points, the number of the carriers supported by the UE and the number of the HS-SCCH subsets, or the UE stops searching when the number of frequency points is not configured and the total number of the searched HS-SCCHs reaches the minimum value among the number of the carriers supported by the UE and the number of the HS-SCCH subsets, thus further improving the searching efficiency and saving processing resources; and 5) the carrier information item of the HS-SCCHs and the information item of the number of the frequency points indicating the high speed shared resources can both be optional, and hence, the present invention is compatible for the circumstance of a single-carrier.

INDUSTRIAL APPLICABILITY

The present invention can be applied for the configuration and searching of the HS-SCCHs of a multi-carrier cell in a TD-SCDMA system, and can improve the efficiency of searching the HS-SCCHs performed by UE with meeting normal communication demands. In addition, the present invention has advantages such as easy realization and good compatibility.

What is claimed is:

1. A method for configuring and searching high speed shared control channels HS-SCCHs in a multi-carrier cell, which is applied to a Time Division Synchronization Code Division Multiple Access system, and the method comprises the following steps:
   (a) the network side configuring the configuration information of a high speed shared control channel HS-SCCH set for a mobile terminal UE and notifying the UE through a high layer signaling, wherein the configuration information includes the information about the frequency points of high speed shared resources to which each HS-SCCH corresponds and the information about the number of the frequency points of the high speed shared resources;
   (b) after receiving the high layer signaling, the UE saving the HS-SCCH set, and dividing it into several HS-SCCH subsets, wherein the HS-SCCHs in the same subset correspond to the information about the same frequency point;
   (c) when the UE searches the HS-SCCHs, it first selects the minimum value represented as N from the number of carriers supported by the UE itself, the number of the frequency points of the high speed shared resources configured by the network side and the number of the HS-SCCH subsets, and adding all HS-SCCH subsets into a group of the HS-SCCH subsets to be searched;
   (d) the UE searching each HS-SCCH subset to be searched in turn, and if the UE finds a HS-SCCH being consistent with its own identification in a subset, then stopping searching the other HS-SCCHs in the subset, the UE moving the subset out of the group of the HS-SCCH subsets to be searched, and adding the found HS-SCCH into a valid HS-SCCH set, and monitoring all HS-SCCHs in the valid HS-SCCH set; and
   (e) the UE judging whether the number of the HS-SCCHs in the valid HS-SCCH set equals to N or not, if not, returning to step (d), and if yes, stopping searching and end.

2. The method according to claim 1, characterized in that in the step (a), when the network side configures the high speed shared control channel HS-SCCH set, in the configuration information of each high speed shared control channel of "high speed downlink shared channel information response" information element of a Iub interface high speed downlink packet access resource allocation success response message, the information about the frequency point of a high speed shared resource to which the HS-SCCH corresponds is added;
   and in the configuration information of each HS-SCCH of "HS-SCCH Information" information element of a Uu interface application service response message, the information about the frequency points of the high speed shared resources to which the HS-SCCH corresponds is added.

3. The method according to claim 1, characterized in that in the step (a), when the network side configures the high speed shared control channel HS-SCCH set, in the "high speed downlink shared channel information response" information element of a Iub interface high speed downlink packet access resource allocation success response message, the information about the number of the frequency points of high speed shared resources is added;
   and in the "HS-SCCH Information" information element of a Uu interface application service response message, the information about the number of the frequency points of high speed shared resources is added.

4. The method according to claim 1, characterized in that the information about the frequency points of high speed shared resources to which said each HS-SCCH corresponds is not configured in a single-carrier but must be configured in a multi-carrier; and the information about the number of the frequency points of the high speed shared resource is only applied to a multi-carrier and may also not be configured in a multi-carrier.

5. The method according to claim 1, characterized in that in the step (a), when the network side configures the high speed shared control channel HS-SCCH set, one to four HS-SCCHs are configured for each carrier of the high speed shared resources, all HS-SCCHs allocated to the UE constitute the HS-SCCH set, the HS-SCCHs configured for one carrier constitute a HS-SCCH subset, the number of the frequency points of the high speed shared resources is smaller than or equal to the number of the HS-SCCH subsets, and at the same TTI, in each HS-SCCH subset, only one HS-SCCH can include the identification of the UE.

6. The method according to claim 1, characterized in that if one or more HS-SCCHs in the valid HS-SCCH set monitored by the UE cannot read the identification being consistent with itself or cannot be read, then the UE moves the HS-SCCH out of the valid HS-SCCH set and will not monitor it any more, then the UE searches the other HS-SCCHs in the same subset, if it finds a HS-SCCH being consistent with its own identification, the UE adds the same into the valid HS-SCCH set, otherwise it adds the subset into a group of the HS-SCCH subsets to be searched, and then perform searching in the same way as in the above steps (d) and (e).

7. A method for configuring and searching high speed shared control channel HS-SCCH in a multi-carrier cell, which is applied to a Time Division Synchronization Code Division Multiple Access system, and the method comprises the following steps:
   (a) the network side configuring the configuration information of a high speed shared control channel HS-SCCH set for a mobile terminal UE and notifying the UE through a high layer signaling, wherein the configuration information includes the information about the frequency points of high speed shared resources to which each HS-SCCH corresponds;
   (b) after receiving the high layer signaling, the UE saving the HS-SCCH set, and dividing it into several HS-SCCH subsets, wherein the HS-SCCHs in the same subset correspond to the information about the same frequency point;
   (c) when the UE searches the HS-SCCHs, it first selects the minimum value represented as N from the number of the carriers supported by the UE itself and the number of the HS-SCCH subsets, and adding all HS-SCCH subsets into a group of the HS-SCCH subsets to be searched;
   (d) the UE searching each HS-SCCH subset to be searched in turn, and if the UE finds a HS-SCCH being consistent with its own identification in a subset, then the UE stopping searching the other HS-SCCHs in the subset, the UE moving the subset out of the group of the HS-SCCH subsets to be searched, and adding the found HS-SCCH into a valid HS-SCCH set, and monitoring all HS-SCCHs in the valid HS-SCCH set; and (e) the UE judging whether the number of HS-SCCHs in the valid HS-SCCH set equals to N or not, if not, returning to step (d), and if yes, stop searching and end.

8. The method according to claim 7, characterized in that in the step (a), when the network side configures the high speed shared control channel HS-SCCH set, in the configuration information of each HS-SCCH of "high speed downlink shared channel information response" information element of a Iub interface high speed downlink packet access resource allocation success response message, the information about the frequency points of high speed shared resources to which the HS-SCCH corresponds is added; and in the configuration information of each HS-SCCH of "HS-SCCH Information" information element of a Un interface application service response message. the information about the frequency points of high speed shared resources to which the HS-SCCH corresponds is added.

9. The method according to claim 7, characterized in that in the step (a), when the network side configures the high speed shared control channel HS-SCCH set, one to four HS-SCCHs are configured for each carrier of the high speed shared resources, all HS-SCCHs allocated to the UE constitute the HS-SCCH set, the HS-SCCHs configured for one carrier constitute a HS-SCCH subset, the number of the frequency points of the high speed shared resource is smaller than or equal to the number of the HS-SCCH subsets, and at the same TTI, in each HS-SCCH subset, only one HS-SCCH can include the identification of the UE.

10. The method according to claim 7, characterized in that if one or more HS-SCCHs in a valid HS-SCCH set monitored by the UE cannot read an identification being consistent with itself or cannot be read, then the UE moves the HS-SCCH out of the valid HS-SCCH set and will not monitor it any more, then the UE searches the other HS-SCCHs in the same subset, if it fmds a HS-SCCH being consistent with its own identification, the UE adds the same into the valid HS-SCCH set, otherwise it adds the subset to the group of the HS-SCCH subsets to be searched, and then conducting searching in the same method as that in the above steps (d) and (e).

\* \* \* \* \*